US009643481B2

United States Patent
Goleski et al.

(10) Patent No.: US 9,643,481 B2
(45) Date of Patent: May 9, 2017

(54) MULTI-MODE POWERSPLIT HYBRID TRANSMISSION (71) Applicant: Ford Global Technologies, LLC, Dearborn, MI (US)

(72) Inventors: Gregory Daniel Goleski, Rochester Hills, MI (US); Shailesh Shrikant Kozarekar, Novi, MI (US); David Allen Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 117 days.

(21) Appl. No.: 14/716,998

(22) Filed: May 20, 2015

(65) Prior Publication Data
US 2016/0339777 A1 Nov. 24, 2016

(51) Int. Cl.
*B60K 6/547* (2007.10)
*B60K 6/442* (2007.10)
*B60K 6/365* (2007.10)

(52) U.S. Cl.
CPC .............. *B60K 6/547* (2013.01); *B60K 6/365* (2013.01); *B60K 6/442* (2013.01); *B60Y 2200/92* (2013.01); *B60Y 2300/182* (2013.01); *B60Y 2400/73* (2013.01); *Y10S 903/91* (2013.01)

(58) Field of Classification Search
CPC ........ B60K 6/547; B60K 6/365; B60K 6/442; F16H 2200/2007; F16H 2200/201; Y10S 903/91; Y10S 903/911
See application file for complete search history.

(56) References Cited

U.S. PATENT DOCUMENTS

| 5,558,595 | A | 9/1996 | Schmidt et al. |
| 5,730,675 | A | 3/1998 | Yamaguchi |
| 5,931,757 | A | 8/1999 | Schmidt |
| 6,371,878 | B1 | 4/2002 | Bowen |
| 7,081,060 | B2 | 7/2006 | Hata et al. |
| 7,086,977 | B2 | 8/2006 | Supina et al. |
| 7,128,677 | B2 | 10/2006 | Supina et al. |
| 7,195,574 | B2 | 3/2007 | Mattsson |
| 7,473,199 | B2 * | 1/2009 | Bucknor ............... B60K 6/365 475/5 |

(Continued)

OTHER PUBLICATIONS

Conlon, Brendan, Comparative Analysis of Single and Combined Hybrid Electrically Variable Transmission Operating Modes, Advanced Hybrid Vehicle Powertrains 2005 (SP-1973), SAE Technical Paper Series, 2005-01-1162, Apr. 11-14, 2005, 13 pages.

(Continued)

*Primary Examiner* — Sherry Estremsky
(74) *Attorney, Agent, or Firm* — David B. Kelley; Brooks Kushman P.C.

(57) ABSTRACT

A family of hybrid electric transmissions operate in at least three modes based on selective engagement of shift elements. In a low mode, torque in a mechanical power flow path is multiplied for better low speed performance. At higher vehicle speeds, the transmission shifts into a high mode to improve efficiency. Some embodiments include a reverse mode. In other embodiments, a series mode may be used in reverse. The shift elements may include friction clutches, positive engagement clutches, and controllable one way clutches.

26 Claims, 7 Drawing Sheets (56) References Cited

U.S. PATENT DOCUMENTS

| | | | |
|---|---|---|---|
| 7,497,803 B2 * | 3/2009 | Sah | B60K 6/40 |
| | | | 477/3 |
| 7,572,201 B2 | 8/2009 | Supina et al. | |
| 7,690,455 B2 | 4/2010 | Kano et al. | |
| 7,694,762 B2 | 4/2010 | Supina et al. | |
| 7,963,874 B2 | 6/2011 | Conlon | |
| 8,142,317 B2 | 3/2012 | Nagamatsu | |
| 8,267,231 B2 * | 9/2012 | Holmes | B60K 6/365 |
| | | | 192/43.1 |
| 8,287,425 B2 | 10/2012 | Omote et al. | |
| 8,491,431 B2 * | 7/2013 | Si | B60K 6/365 |
| | | | 475/284 |
| 8,734,287 B2 | 5/2014 | Kim et al. | |
| 9,096,219 B2 * | 8/2015 | Okuwaki | B60K 6/445 |

OTHER PUBLICATIONS

Wang, Yubin, et al., Review of Electronic-continuously Variable Transmission Propulsion System for Full Hybrid Electric Vehicles, Journal of Asian Electric Vehicles, vol. 7, No. 2, Dec. 2009, 6 pages.

* cited by examiner

MULTI-MODE POWERSPLIT HYBRID TRANSMISSION

TECHNICAL FIELD

This disclosure relates to the field of automatic transmissions for motor vehicles. More particularly, the disclosure pertains to an arrangement of gears, clutches, motors, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input driven by an engine crankshaft, often via a launch device such as a torque converter, and an output driving the vehicle wheels, often via a differential assembly which permits the left and right wheel to rotate at slightly different speeds as the vehicle turns. In front wheel drive vehicles with transverse mounted engines, the engine crankshaft axis is typically offset from the axle axis.

Hybrid electric transmissions further reduce fuel consumption by including one or more reversible electric machines and some type of electrical energy storage such as a battery. Hybrid electric transmissions improve fuel efficiency is several ways. Most internal combustion engines are most efficient when operated at relatively high power settings. A hybrid electric transmission permits operating the engine part of the time at a higher power level than needed for propulsion while storing the excess power in the battery. Then, at other times, the engine is shut off and the vehicle is propelled using the stored energy. Although the engine generates the same amount of total energy, it operates at a higher average efficiency. Also, when the brakes are applied, the reversible electrical machine may capture the vehicle kinetic energy and store it in the battery for later use for propulsion. When the vehicle is stationary and therefore does not require propulsion, the engine can be shut off to eliminate the fuel that would otherwise be used to maintain an idle speed. The electric motor provides the ability to propel the vehicle with the engine off and to rapidly restart the engine when necessary.

Figure 1:
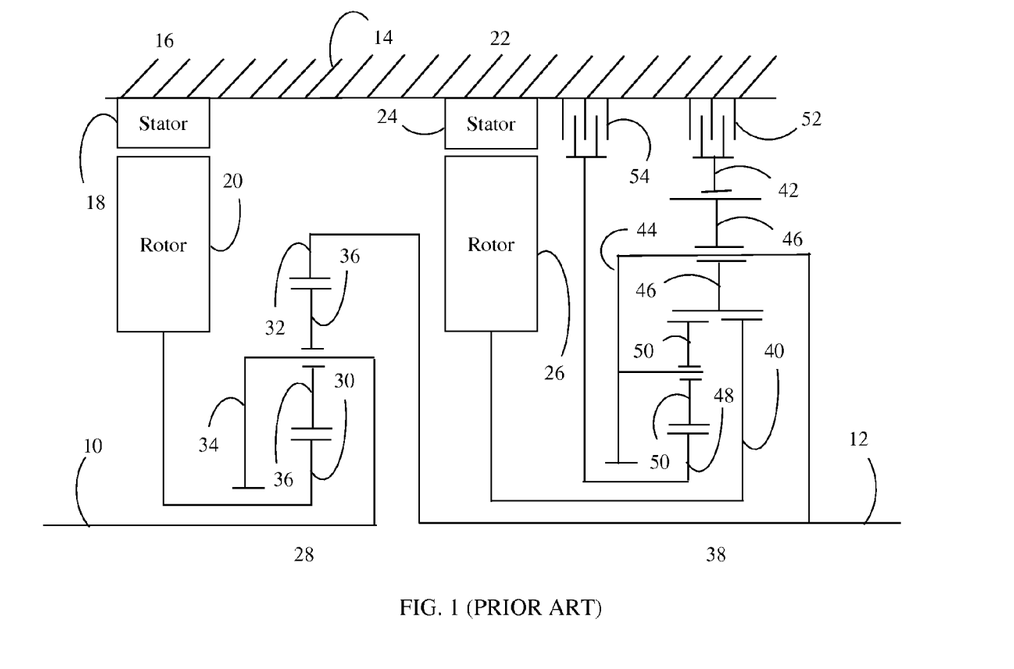
FIG. 1 is a schematic diagram of a prior art hybrid transmission gearing arrangement.

A hybrid electric transmission layout is shown in FIG. 1. Input shaft 10 is driven by the engine crankshaft. Output shaft 12 drives the vehicle wheels. The transmission components are supported within transmission housing 14. A first reversible electric machine 16 includes a stator 18 fixed to housing 14 and a rotor 20. A second reversible electric machine 22 includes a stator 24 fixed to housing 14 and a rotor 26. Although both electric machines are capable of both converting electrical power into mechanical power (motoring) and converting mechanical power into electrical power (generating), the first electric machine may be referred to as the generator and the second electric machine may be referred to as the motor. A simple planetary gear set 28 includes a sun gear 30 fixedly coupled to rotor 20, a ring gear 32 fixedly coupled to output shaft 12, a carrier 34 fixedly coupled to input shaft 10, and a set of planet gears 36 supported to rotate with respect to carrier 34 and to mesh with both sun gear 30 and ring gear 32. Gear set 28 divides the torque from the internal combustion engine between the output shaft and the first rotor. Ravigneux gear set 38 includes sun gear 40 fixedly coupled to second rotor 26, ring gear 42, carrier 44 fixedly coupled to output shaft 12, and a set of long planet gears 46 supported for rotation with respect to carrier 44 and to mesh with both sun gear 40 and ring gear 42. Ravigneaux gear set 38 further includes sun gear 48 and a set of short planet gears that each mesh with sun gear 48 and one of the long planet gears 46. Brake 52 selectively holds ring gear 42 against rotation. When brake 52 is engaged, a low underdrive speed relationship is established between rotor 26 and output shaft 12. Brake 54 selectively holds sun gear 48 against rotation. When brake 54 is engaged, a high underdrive speed relationship is established between rotor 26 and output shaft 12.

To launch the vehicle in a forward direction, brake 52 is engaged. Whenever the vehicle is stationary, output shaft 12 is also stationary. Forward rotation of input shaft 10 when output shaft 12 is stationary or moving slowly causes rotor 20 to rotate in a forward direction at a speed higher than the speed of input shaft 10. Electrical voltage in stator 18 is controlled such that rotor 20 exerts torque in the negative direction providing a reaction torque. Consequently, ring 32 exerts a forward torque proportional to the input shaft torque on output shaft 12. Since the rotor is exerting torque in the opposite direction of its rotation, electrical machine 16 acts as a generator producing electrical power. Electrical voltage in stator 24 is controlled to utilize that electrical power to exert a positive torque on sun gear 40. With brake 52 engaged, rotor 26 rotates in the same direction as output shaft 12 at a fixed multiple of the speed of output shaft 12. The speed ratio is determined by the tooth counts on sun gear 40 and ring gear 42. Disregarding motor efficiency, for a given amount of electrical power, the torque generated by rotor 26 is inversely proportional to rotor speed. Gear set 38 multiplies the torque produced by rotor 26 by the speed ratio and transmits that torque to output shaft 12. The total torque on output shaft 12 is the sum of the torque exerted by ring gear 32 and the torque exerted by carrier 44.

As the vehicle speed increases, the speed of rotor 26 may exceed its maximum operating speed. The transmission may shift into a high speed operating mode by gradually releasing brake 52 while gradually engaging brake 54. With brake 54 engaged, the rotor 26 rotates at a lower multiple of output shaft 12 speed than when brake 52 is engaged. The speeds of the input shaft 12 and rotor 20 are not impacted by this shift. At a sufficiently high output shaft speed relative to the input shaft speed, rotor 20 begins to rotate in the opposite direction. In order to continue providing a reaction to engine torque, electrical machine 16 must act as a motor. The electrical power required by electrical machine 16 must either come from the battery or by operating electrical machine 22 as a generator. In this circumstance, power circulates from machine 16, to output shaft 12, to machine 22, and back to machine 16. Such circulation of power results in reduced overall power transfer efficiency.

Brake 52 is also engaged to launch the vehicle in a reverse direction. Stator 24 is controlled such that rotor 26 exerts torque in a reverse direction which is transmitted to output shaft 12. If the battery state of charge is sufficient, the battery may provide the power required by machine 22 in reverse. If the battery state of charge is too low or some other circumstance prevents using battery power, then the power must be produced by operating machine 16 as a generator. As when launching in a forward direction, using machine 16 as a generator causes ring gear 32 to exert torque in the positive direction on output shaft 12. This torque opposes the negative torque exerted by machine 22 through gear set 38 reducing the total output shaft torque. Consequently, machine 22 must produce even more torque. Since the maximum torque capability of machine 22 is limited, the maximum reverse torque capability of the transmission in reverse is considerably less than the maximum capability in forward, especially when the battery state of charge is low.

SUMMARY OF THE DISCLOSURE

A transmission includes input and output shafts, a first intermediate shaft, first and second electric machines, gearing, and shift elements. The gearing and shift elements are configured to establish a number of fixed and selective speed relationships. A fixed linear speed relationship among the first rotor, the input shaft, and the first intermediate shaft is established, for example, by a first simple planetary gear set. The first sun gear is fixedly coupled to the first rotor, the first carrier is fixedly coupled to the input shaft, and the first ring gear is fixedly coupled to the intermediate shaft. In some embodiments, a four element fixed linear speed relationship may be established among a second intermediate shaft, the input shaft, the first rotor, and the first intermediate shaft. A fixed underdrive speed relationship between the second rotor and the output shaft is established, for example, by a second simple planetary gear set. The second sun gear is fixedly coupled to the second rotor, the second carrier is fixedly coupled to the output shaft, and the second ring gear is fixedly held against rotation. A selective underdrive speed relationship is established between the intermediate shaft and the output shaft. A clutch may establish this underdrive speed relationship by selectively coupling the intermediate shaft to the second sun gear. Alternatively, it may be established by a brake in conjunction with a third planetary gear set. One or more clutches selectively couples the intermediate shaft to the output shaft, either directly or by locking up the third gear set. A brake selectively holds one of the intermediate shafts against rotation.

A method of operating a hybrid electric transmission, such as the transmission described above, includes engaging a low mode, shifting from the low mode into a high mode, and engaging a series mode. In the low mode, an underdrive speed relationship is established between the intermediate shaft and the output. In the high mode, the intermediate shaft is operatively coupled to the output. In the series mode, a proportional speed relationship is established between the input and the first rotor. In some embodiments, the method may include shifting into a reverse mode.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. The speed of an element is positive when the element rotates in one direction and negative when the element rotates in the opposite direction. A proportional speed relationship exist between two elements when the ratio between the speeds of the elements is a predetermined value. A proportional speed relationship between a first element and a second element is an overdrive relationship if the second element always rotates faster than and in the same direction as the first element. Similarly, a proportional speed relationship between a first element and a second element is an underdrive relationship if the second element always rotates slower than and in the same direction as the first element.

A group of rotating elements are fixedly coupled to one another if they are constrained to rotate at the same speed about the same axis in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate at the same speed about the same axis whenever the shift element is fully engaged and the rotating elements are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Elements are driveably connected if a power flow path establishes a proportional speed relationship between the elements.

An element is a transmission input if it is adapted to be fixedly driveably connected to an engine. A transmission input may be coupled to an engine via a damper designed to absorb torsional vibrations. An element is a transmission output if it is adapted to be fixedly driveably connected to components outside the transmission such as vehicle wheels or a transfer case.

Figure 2:
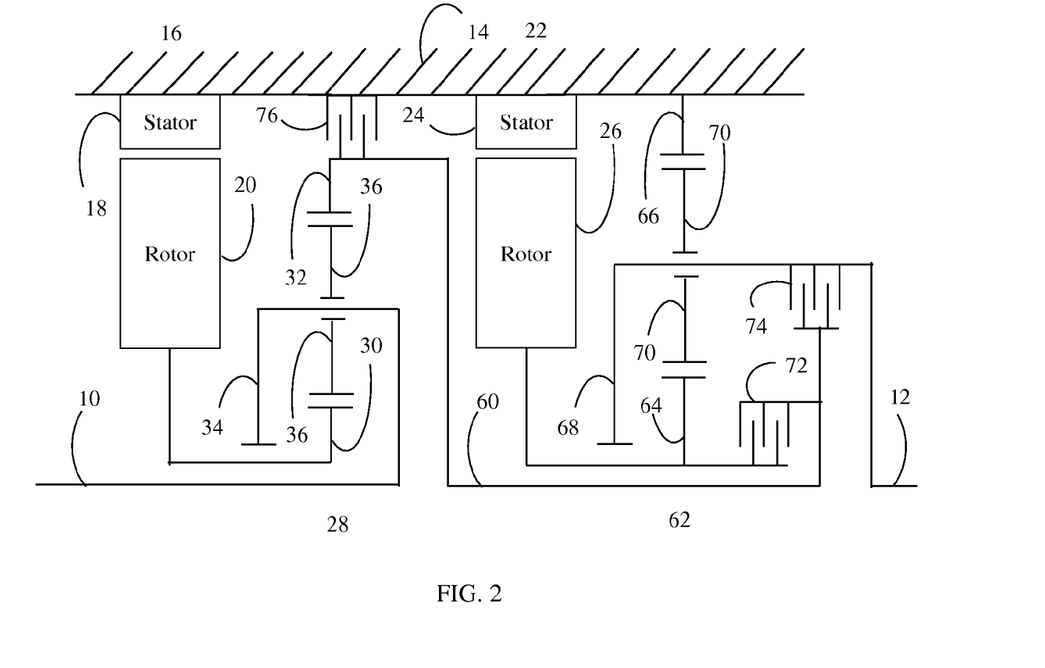
FIG. 2 is a schematic diagram of a first hybrid transmission gearing arrangement.

An improved hybrid electric transmission layout is shown in FIG. 2. Input shaft 10 is driven by the engine crankshaft. Output shaft 12 drives the vehicle wheels. The transmission components are supported within transmission housing 14. A first reversible electric machine 16 includes a stator 18 fixed to housing 14 and a rotor 20. A second reversible electric machine 22 includes a stator 24 fixed to housing 14 and a rotor 26. First simple planetary gear set 28 includes a sun gear 30 fixedly coupled to rotor 20, a ring gear 32 fixedly coupled to intermediate shaft 60, a carrier 34 fixedly coupled to input shaft 10, and a set of planet gears 36 supported to rotate with respect to carrier 34 and to mesh with both sun gear 30 and ring gear 32. Gear set 28 divides the torque from the internal combustion engine between the intermediate shaft and the first rotor. Second simple planetary gear set 62 includes a sun gear 64 fixedly coupled to rotor 26, a ring gear 66 fixedly held against rotation, a carrier 68 fixedly coupled to output shaft 12, and a set of planet gears 70 supported to rotate with respect to carrier 68 and to mesh with both sun gear 64 and ring gear 66. Gear set 62 fixedly establishes an underdrive speed relationship between rotor 26 and output shaft 12. Other types of gearing arrangements, such as those using axis transfer gearing, are capable of establishing a fixed underdrive speed relationship.

Clutch 72 selectively couples intermediate shaft 60 to sun gear 64 and rotor 26, thereby selectively establishing an underdrive speed relationship between intermediate shaft 60 and output shaft 12. Clutch 74 selectively couples intermediate shaft 60 to output shaft 12. Brake 76 selectively holds intermediate shaft 60 against rotation.

To launch the vehicle in a forward direction, clutch 72 is engaged. Whenever the vehicle is stationary, output shaft 12 is also stationary. With clutch 72 engaged, intermediate shaft 60 is also stationary when the vehicle is stationary. Forward rotation of input shaft 10 when intermediate shaft 60 is stationary or moving slowly causes rotor 20 to rotate in a forward direction at a speed higher than the speed of input shaft 10. Electrical voltage in stator 18 is controlled such that rotor 20 exerts torque in the negative direction providing a reaction torque. Consequently, ring 32 exerts a forward torque proportional to the input shaft torque on intermediate shaft 60 which clutch 72 transmits to output shaft 12. Since the rotor is exerting torque in the opposite direction of its rotation, electrical machine 16 acts as a generator producing electrical power. Electrical voltage in stator 24 is controlled to utilize that electrical power to exert a positive torque on sun gear 64. Gear set 62 multiplies the torque produced by rotor 26 by a fixed ratio and transmits that torque to output shaft 12. The total torque on output shaft 12 is the fixed ratio multiplied by the sum of the torque exerted by ring gear 32 and the torque exerted by rotor 26. This differs from the arrangement of FIG. 1 in that the torque exerted by ring gear 32 is multiplied by a fixed ratio. Therefore, with the same tooth numbers and motor capability, the arrangement of FIG. 2 is capable of generating more torque to launch the vehicle in a forward direction than the arrangement of FIG. 1.

As the vehicle speed increases, the speed of intermediate shaft 60 will increase. At a sufficiently high intermediate shaft speed relative to the input shaft speed, rotor 20 slows down and eventually begins to rotate in the opposite direction. Maximum efficiency generally occurs when the speed of rotor 20 is near zero and all power is transferred mechanically. When rotor 20 begins to rotate backwards, machine 16 must act as a motor, machine 22 must act as a generator, and efficiency decreases. In response to vehicle speed increasing, the transmission may shift into a high range by gradually disengaging clutch 72 and gradually engaging clutch 74. The shift may be accomplished in phases. In the first phase, torque output of the engine, machine 16, and machine 22 is adjusted such that machine 22 provides all propulsion using stored battery power. Then, clutch 72 is released. With all shift elements released, machine 16 and the engine are controlled to synchronize the speed of intermediate shaft 60 with the speed of output shaft 12. Finally, clutch 74 is engaged. With clutch 74 engaged, intermediate shaft 60 rotates at the same speed as output shaft 12 instead of rotating at a multiple of the speed. The arrangement of FIG. 2 may be operated with the speed of rotor 20 close to optimal a higher percentage of the time than the arrangement of FIG. 1, so average power transfer efficiency is improved.

To launch the vehicle in reverse, brake 76 is engaged and clutches 72 and 74 are both released. Rotor 20 rotates at a fixed multiple of the speed of input shaft 10. Electrical power generated by machine 16 is supplied to machine 22 which is controlled to produce torque in a negative direction on sun gear 64. This torque is then multiplied by the fixed ratio of gear set 62 and transmitted to output shaft 12. Unlike the arrangement of FIG. 1, no torque is transmitted from ring gear 32 to output shaft 12. Since all power is converted to electrical power by machine 16 and then converted back to mechanical power by machine 22, this is called a series operating mode. The full torque generated by machine 22 is delivered to output shaft 12. As with the arrangement of FIG. 1, power to machine 22 may be supplied by battery power when the state of charge is sufficient. Unlike the arrangement of FIG. 1, however, the output torque capability does not decline when the engine is used to supply the power.

The state of the shift elements in each operating mode is summarized in Table 1.

TABLE 1

|  | 72 | 74 | 76 |
|---|---|---|---|
| Series |  |  | X |
| Low | X |  |  |
| High |  | X |  |

Figure 3:
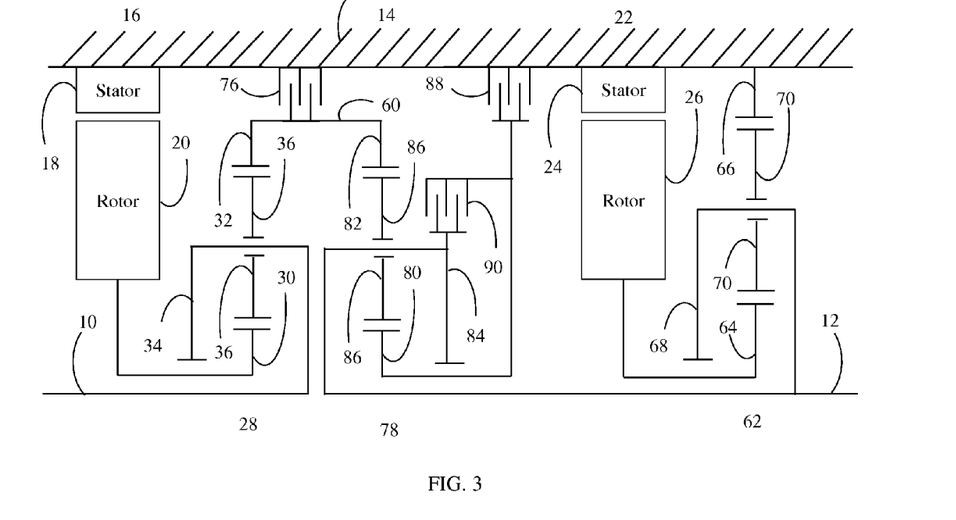
FIG. 3 is a schematic diagram of a second hybrid transmission gearing arrangement.

Another hybrid electric transmission layout is shown in FIG. 3. Third simple planetary gear set 78 includes a sun gear 80, a ring gear 82 fixedly coupled to intermediate shaft 60, a carrier 84 fixedly coupled to output shaft 12, and a set of planet gears 86 supported to rotate with respect to carrier 84 and to mesh with both sun gear 80 and ring gear 82. Brake 88 selectively holds sun gear 80 against rotation. Clutch 90 selectively couples sun gear 80 to carrier 84. Coupling any two members of gear set 78 to one another operatively couples intermediate shaft 60 to output shaft 12.

Relative to the arrangement of FIG. 2, additional gear set 78 permits selection of a low range speed ratio between intermediate shaft 60 and output shaft 12 that differs from the fixed speed ratio between rotor 26 and output shaft 12.

Operation of the arrangement of FIG. 3 is similar to operation of the arrangement of FIG. 2. To launch the vehicle in forward, brake 88 is engaged. In response to vehicle speed increasing, the transmission may shift into a high range by gradually disengaging brake 88 and gradually engaging clutch 90. Since the ratio between output shaft speed and intermediate shaft speed in low range is different than in the arrangement of FIG. 2, this shift may occur at a different vehicle speed. As in the arrangement of FIG. 2, the shift may be accomplished in phases using machine 16 to synchronize speeds while using machine 22 to propel the vehicle.

The state of the shift elements in each operating mode is summarized in Table 2.

TABLE 2

|  | 76 | 88 | 90 |
|---|---|---|---|
| Series | X | | |
| Low | | X | |
| High | | | X |

Figure 4:
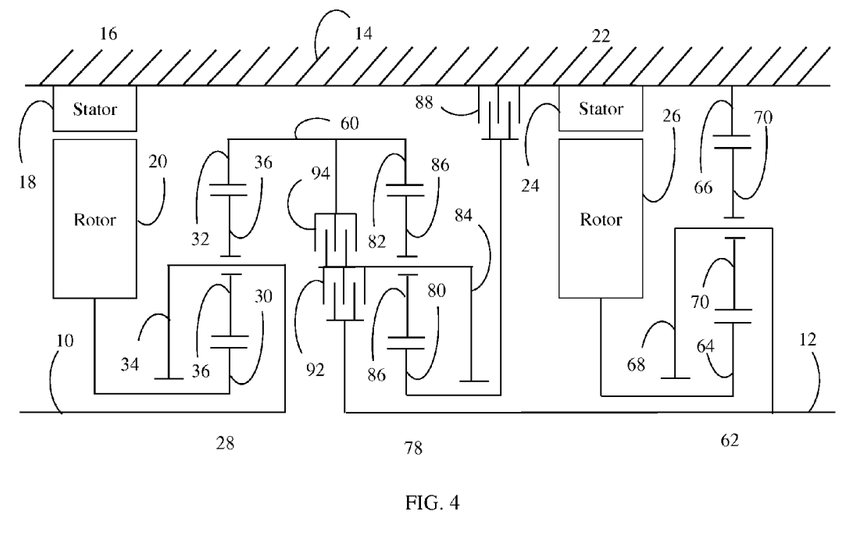
FIG. 4 is a schematic diagram of a third hybrid transmission gearing arrangement.

Another hybrid electric transmission layout is shown in FIG. 4. Carrier 84 is selectively coupled to output shaft 12 by clutch 92 as opposed to being fixedly couples as in the arrangement of FIG. 3. Clutch 94 selectively couples carrier 84 to ring gear 82 operatively coupling all of the elements of gear set 78 to intermediate shaft 60.

Operation of the arrangement of FIG. 4 is similar to operation of the arrangements of FIGS. 2 and 3, except that two shift elements are engaged in each operating range instead of only one. To launch the vehicle in forward, brake 88 and clutch 92 are engaged. In response to vehicle speed increasing, the transmission may shift into a high range by gradually disengaging brake 88 and gradually engaging clutch 94. As in the arrangements of FIGS. 2 and 3, the shift may be accomplished in phases using machine 16 to synchronize speeds while using machine 22 to propel the vehicle. To launch the vehicle in reverse, brake 88 and clutch 94 are engaged.

The state of the shift elements in each operating mode is summarized in Table 3.

TABLE 3

|  | 88 | 92 | 94 |
|---|---|---|---|
| Series | X | | X |
| Low | X | X | |
| High | | X | X |

Figure 5:
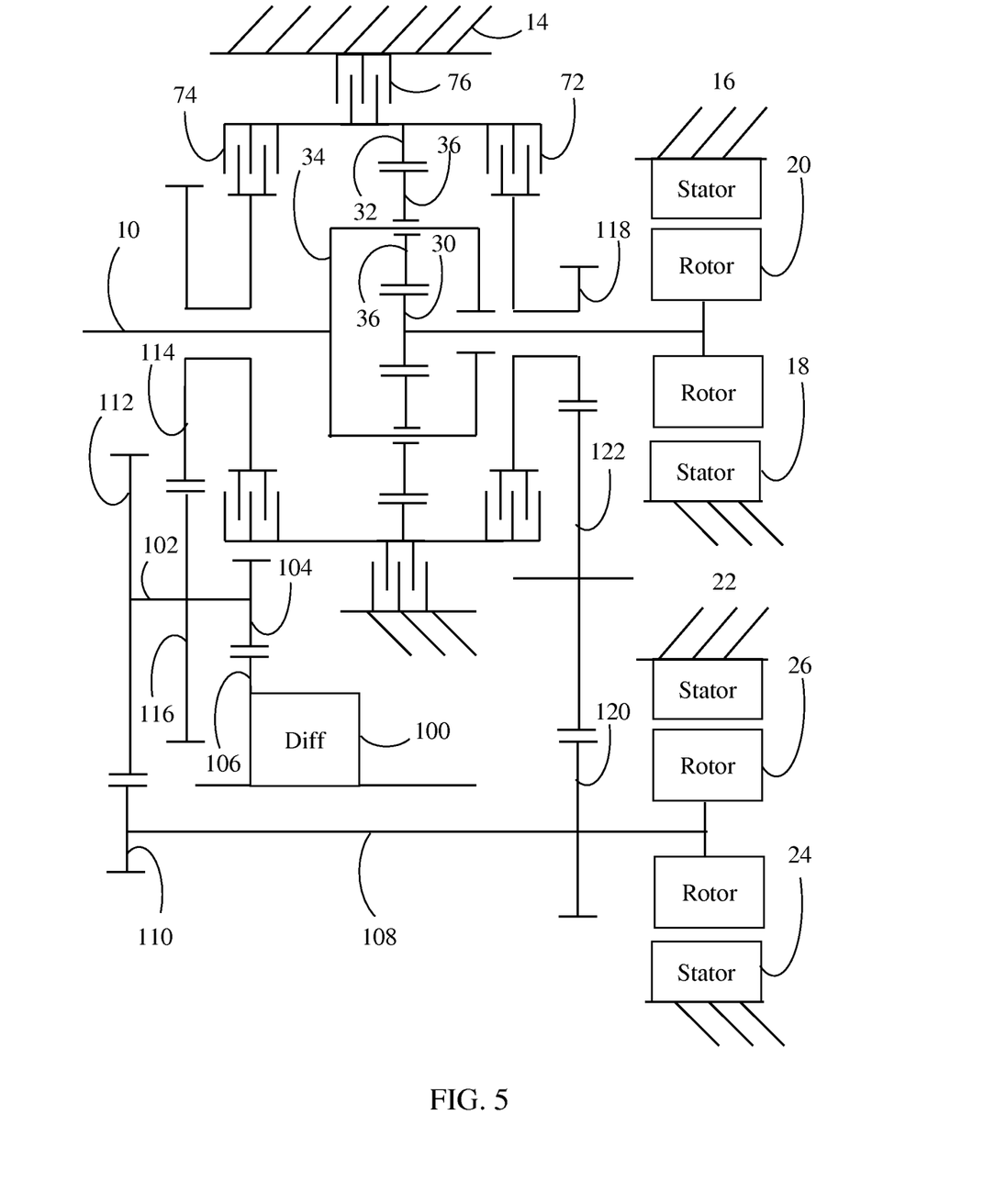
FIG. 5 is a schematic diagram of a fourth hybrid transmission gearing arrangement.

A front wheel drive hybrid electric transmission layout is shown in FIG. 5. In a front wheel drive vehicle, the drive wheels rotate about an axis parallel to, but offset from, the axis of the engine crankshaft. A differential 100 is located on or nearly on the front wheel axis. (Slight differences in axis may be accommodated with CV joints.) In some embodiments, power is transferred from an output element on the crankshaft axis to the differential axis by a single power flow path made up of layshaft gearing or a chain and sprockets with a fixed gear ratio. In other embodiments, such as the embodiment of FIG. 5, the axis transfer gearing may also be used to establish some of the speed relationships between transmission components.

Output shaft 102 rotates about a third axis parallel to but offset from both the crankshaft axis and the differential axis. Gear 104, which is fixedly coupled to output shaft 102 meshes with gear 106 which is fixedly coupled to the differential carrier. Rotor 26 of traction motor 22 drives motor shaft 108 which rotates about a fourth parallel axis. Gear 110, which is fixedly coupled to motor shaft 108 meshes with gear 112 which is fixedly coupled to output shaft 102, accomplishing the fixed torque multiplication and speed reduction that is accomplished by planetary set 62 in the embodiments of FIGS. 2-4. Gear 114 is selectively coupled to ring gear 32 and meshes with gear 116 which is fixedly coupled to output shaft 102. The number of teeth on gear 114 is close to the number of teeth on gear 116, but not necessarily identical. Collectively, gear 114, 116, and clutch 74 selectively cause ring gear 32 and the output shaft to rotate at nearly the same speed, although in opposite directions, establishing a high range operating mode. Gear 118 has close to the same number of teeth as gear 120 which is fixedly coupled to motor shaft 108. Idler gear 122 rotates about a fifth axis and meshes with both gears 118 and 120. Clutch 72 selectively couples ring gear 32 to gear 118. Collectively, clutch 72 and gears 118, 120, and 122 selectively cause motor shaft 108 and ring gear 32 to rotate at nearly the same speed to establish a low range operating mode. Finally, brake 76 selectively holds ring gear 32 against rotation to establish a series operating mode. Operation of the arrangement of FIG. 5 is similar to operation of the arrangements of FIGS. 2 and 3.

Figure 6:
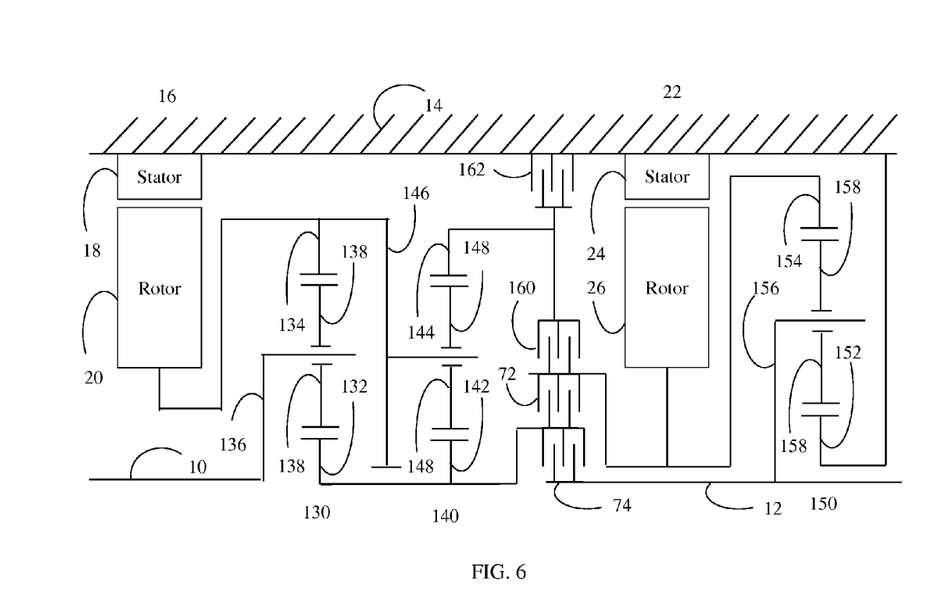
FIG. 6 is a schematic diagram of a fifth hybrid transmission gearing arrangement.

Another hybrid electric transmission layout is shown in FIG. 6. Three simple planetary gear sets 130, 140, and 150 each include a sun gear, a ring gear, and a carrier supporting planet gears that mesh with both the sun gear and the ring gear. Carrier 136 is fixedly coupled to input 10. Rotor 20, ring gear 134, and carrier 146 are mutually fixedly coupled. Sun gear 132 is fixedly coupled to sun gear 142. Rotor 26 is fixedly coupled to ring gear 154. Carrier 156 is fixedly coupled to output 12. Sun gear 152 is fixedly held against rotation. Sun gear 132 and 142 are selectively coupled to rotor 26 by clutch 72 and selectively coupled to output 12 by clutch 74. Ring gear 144 is selectively coupled to rotor 26 by clutch 160 and selectively held against rotation by brake 162.

Operation of the vehicle in a forward direction is analogous to operation of the arrangements of FIG. 2. To launch the vehicle in a forward direction, clutch 72 is engaged. During launch, electric machine 16 generates power and electric machine 22 provides additional output torque. Some power is transferred mechanically from the input 10 to ring gear 154 via gear sets 130 and 140 and clutch 72. The remainder of the power is transferred electrically via electric machines 16 and 22. Some of the power in the electrical path may be stored in a battery. Alternatively, the battery may be used to provide additional power into the electrical path. Gear set 150 multiplies the torque. Because the sun gear is fixed as opposed to the ring gear as in FIGS. 2-4, the torque multiplication ratio is lower than in those arrangements.

In response to vehicle speed increasing, the transmission may shift into a high range by gradually disengaging clutch 72 and gradually engaging clutch 74. As with the arrangements of FIGS. 2-5, this shift may be accomplished in phases with electric machine 22 satisfying the output torque demand during the shift. Because gear set 150 provides less torque multiplication than gear set 62 of FIG. 2, the ratio change associated with this shift is less than for the arrangement of FIG. 2.

To launch the vehicle in reverse, 160 is engaged. Rotor 20 exerts a reaction torque resulting in negative torque being transmitted from ring gear 144 through clutch 160 to ring gear 154. Thus, unlike the previous arrangements, a portion of the power is transmitted mechanically in reverse. The remaining power is transmitted electrically via electric machines 16 and 22. As with operation in the low and high forward drive modes, power in the electrical path may be supplemented with power from a battery or may be diverted to the battery. A series mode is also available by engaging brake 162.

The state of the shift elements in each operating mode is summarized in Table 4. In addition to the four modes discussed above, four fixed ratio modes are available by engaging two shift elements simultaneously. In these four operating modes, a proportional speed relationship with a predefined speed ratio is established between the input 10 and the output 12. All power can be transmitted mechanically from the input 10 to the output 12. The power generated by the engine may be supplemented with power from the battery via either electric machine 16 or 22. Alternatively, some of the power may be diverted to the battery using either electric machine 16 or 22 in a generating mode. One of more fixed ratio modes may also be used as intermediate stages in shifts between continuously variable modes. For example, a shift from low mode to high mode may be accomplished by first engaging brake 162 to enter fixed ratio mode B, then releasing clutch 72 to enter series mode, then engaging clutch 74 to enter fixed ratio mode D, then releasing brake 162 to enter high mode. Each time a clutch is to be engaged, the electric machines may be controlled to synchronize the speeds.

TABLE 4

|         | 72 | 74 | 160 | 162 |
|---------|----|----|-----|-----|
| Reverse |    |    | X   |     |
| Series  |    |    |     | X   |
| Low     | X  |    |     |     |
| High    |    | X  |     |     |
| Fixed A | X  |    | X   |     |
| Fixed B | X  |    |     | X   |
| Fixed C |    | X  | X   |     |
| Fixed D |    | X  |     | X   |

Figure 7:
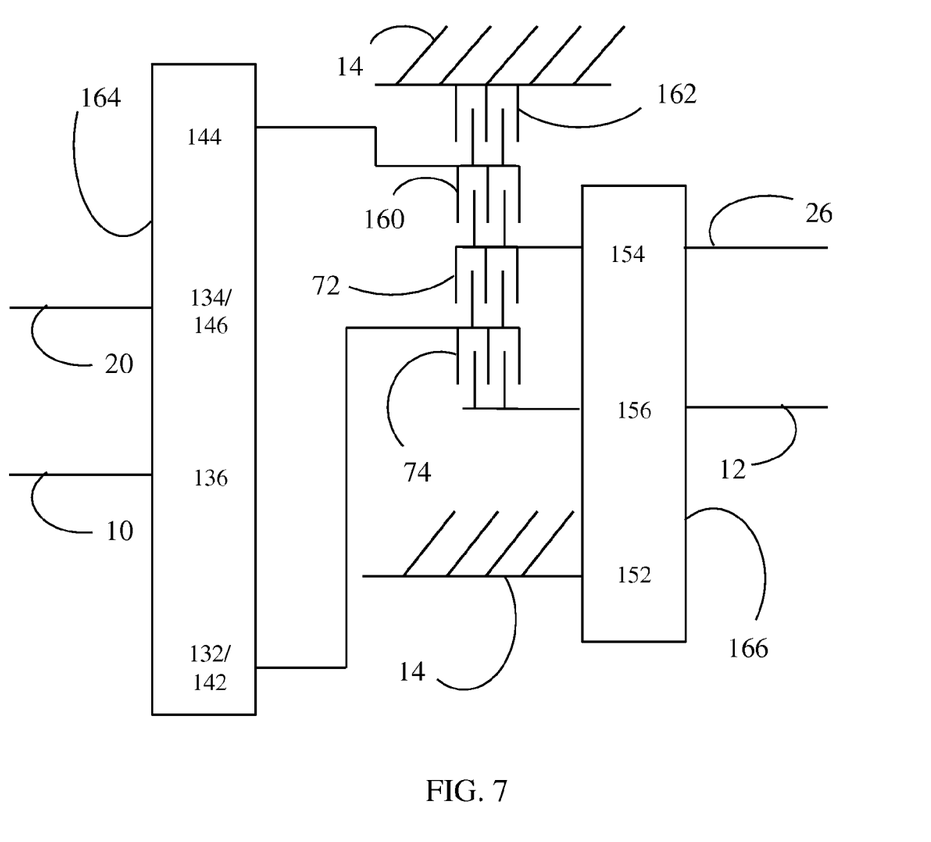
FIG. 7 is a lever diagram corresponding to the transmission gearing arrangement of FIG. 6.

FIG. 7 is a lever diagram that illustrates several speed relationships in the arrangement of FIG. 6. Some of these speed relationships are also established in the arrangements of FIGS. 2-5. Levers 164 and 166 illustrate fixed linear speed relationships. Lever 164 illustrates a fixed linear speed relationship among i) sun gears 132 and 142, ii) carrier 136, iii) ring gear 134 and carrier 146, and iv) ring gear 144. Other gearing arrangements establish a fixed linear speed relationship among four shafts, such as Ravigneaux gear sets, stepped pinion gear sets, and other interconnected pairs of simple and double pinion planetary gear sets. Lever 166 illustrates a fixed linear speed relationship among i) sun gear 152, ii) carrier 156, and iii) ring gear 154. Other gearing arrangements establish fixed linear speed relationships among three shafts. With one of the three shafts fixedly held against rotation, a fixed proportional speed relationship is established between the other two. Other gearing arrangements establish fixed proportional speed relationships, such as gears 110, 112, 104, and 106 of FIG. 5.

A number of selective speed relationships are also established. Engaging clutch 72 selectively establishes a linear speed relationship among rotor 20, input 10, and rotor 26. Engaging clutch 74 selectively establishes a linear speed relationship among rotor 20, input 10, and output 12. Engaging brake 76 in FIG. 2 or brake 162 in FIG. 6 selectively establishes a proportional speed relationship between rotor 20 and input 10. Engaging clutch 160 selectively establishes a linear speed relationship among input 10, rotor 20, and rotor 26.

Each of the shift elements in each of the gearing arrangements may be a hydraulically actuated multi-plate wet friction clutch or brake. A multi-plate clutch or brake includes a clutch pack having friction plates splined to one of the elements interleaved with separator plates splined to the other element. (For a brake, one of the elements is the housing.) Hydraulic pressure applied to a piston squeezes the clutch pack such that friction between the friction plates and separator plates transmits torque from one element to the other element. The torque capacity is proportional to the normal force exerted by the piston which, in turn, is proportional to the hydraulic pressure. A controller adjusts the torque capacity by adjusting an electrical current to a solenoid valve in a valve body which, in turn, adjusts the hydraulic pressure. Pressurized hydraulic fluid may be provided by an engine driven pump or by an electric motor driven pump. If an engine driven pump is utilized, provision may be made to start the engine without reliance on hydraulic pressure to engage clutches. For example, one of the shift elements, such as the element for the series mode, may be electrically actuated as opposed to being hydraulically actuated. The vehicle may be propelled using battery power to drive electric machine 22 while no clutches are engaged. Then, the series mode could be established using electrical actuation and electric machine 16 used to bring the engine up to operating speed. Once the engine is operating, an engine driven pump would enable engagement of other shift elements to establish other driving modes.

Alternatively, some or all of the shift elements may be positive engagement shift elements such as dog clutches or controllable one way clutches. Positive engagement shift elements do not rely on friction to transmit torque and typically produce less parasitic drag when disengaged. However, positive engagement shift elements cannot be gradually engaged while absorbing energy. As discussed above, a shift between low and high may be accomplished without dissipating energy in the shift elements by using the electric machine 16 to synchronize the elements while using machine 22 for propulsion. Shifts into and out of the reverse mode will typically be accomplished with the vehicle nearly stationary and with zero torque demand. Therefore, these shifts may also be accomplished without dissipating energy in the shift elements and with machine 16 used to synchronize element speeds before engagement.

In some embodiments, the off-going element in the low to high shift (72 or 88) may be a controllable one way clutch while the on-coming element for this shift (74, 90, or 94) is a friction clutch. In low mode, and in series mode in the arrangement of FIG. 4, the controllable one way clutch is placed in a state in which it prevents relative rotation in either direction. Prior to the shift from low to high, the controllable one way clutch is placed into a state in which it prevents relative rotation in only one direction. As the on-coming clutch torque capacity is gradually increased, the controllable one way clutch passively releases.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
   input, output, and intermediate shafts;
   first and second electric machine rotors; and
   gearing and shift elements configured to i) fixedly establish a linear speed relationship among the first rotor, the input shaft, and the intermediate shaft, ii) fixedly establish an underdrive relationship between the second rotor and the output shaft, iii) selectively establish an underdrive relationship between the intermediate shaft and the output shaft, iv) selectively operatively couple the intermediate shaft to the output shaft, and v) selectively hold the intermediate shaft against rotation.

2. The transmission of claim 1 wherein the gearing and shift elements comprise a first simple planetary gear set having a first sun gear fixedly coupled to the first rotor, a first ring gear fixedly coupled to the intermediate shaft, and a first carrier fixedly coupled to the input shaft.

3. The transmission of claim 2 wherein the gearing and shift elements further comprise a second simple planetary gear set having a second sun gear fixedly coupled to the second rotor, a second ring gear fixedly held against rotation, and a second carrier fixedly coupled to the output shaft.

4. The transmission of claim 3 wherein the gearing and shift elements further comprise a first brake configured to selectively hold the intermediate shaft against rotation.

5. The transmission of claim 4 wherein the gearing and shift elements further comprise a first clutch configured to selectively operably couple the intermediate shaft to the output shaft.

6. The transmission of claim 5 wherein the first clutch directly couples the intermediate shaft to the output shaft.

7. The transmission of claim 6 wherein the gearing and shift elements further comprise a second clutch configured to selectively couple the intermediate shaft to the second sun gear.

8. The transmission of claim 5 wherein the gearing and shift elements further comprise a third simple planetary gear set having a third sun gear selectively coupled to the output shaft by the first clutch, a third ring gear fixedly coupled to the intermediate shaft, and a third carrier fixedly coupled to the output shaft.

9. The transmission of claim 8 wherein the gearing and shift elements further comprise a second brake configured to selectively hold the third sun gear against rotation.

10. The transmission of claim 3 wherein the gearing and shift elements further comprise:
    a third simple planetary gear set having a third sun gear, a third ring gear fixedly coupled to the intermediate shaft, and a third carrier;
    a first brake configured to selectively hold the third sun gear against rotation;
    a first clutch configured to selectively couple the third carrier to the output shaft; and
    a second clutch configured to operatively selectively couple the intermediate shaft to the third carrier.

11. The transmission of claim 10 wherein the second clutch is configured to directly selectively couple the intermediate shaft to the third carrier.

12. A transmission comprising:
    a first gearing arrangement fixedly establishing a linear speed relationship among a first rotor, an input, and a first intermediate shaft;
    a second gearing arrangement fixedly establishing an underdrive relationship between a second rotor and an output;
    a brake configured to selectively establish a proportional speed relationship between the input and the first rotor; and
    a first clutch configured to selectively couple the first intermediate shaft to the second rotor.

13. The transmission of claim 12 further comprising:
    a second clutch configured to selectively couple the first intermediate shaft to the output.

14. The transmission of claim 13 wherein the brake selectively establishes the proportional speed relationship by selectively holding the first intermediate shaft against rotation.

15. The transmission of claim 13 wherein the first gearing arrangement fixedly establishes a linear speed relationship among a second intermediate shaft, the first rotor, the input, and the first intermediate shaft.

16. The transmission of claim 15 wherein the brake selectively establishes the proportional speed relationship by selectively holding the second intermediate shaft against rotation.

17. The transmission of claim 15 further comprising:
    a third clutch configured to selectively couple the second intermediate shaft to the second rotor.

18. The transmission of claim 13 wherein the brake is a positive engagement brake.

19. The transmission of claim 13 wherein the first clutch and the second clutch are positive engagement clutches.

20. The transmission of claim 13 wherein the second clutch is a friction clutch and the first clutch is a controllable one way clutch.

21. A method of operating a hybrid electric transmission, the transmission having a first gearing arrangement establishing a fixed linear speed relationship among a first rotor of a first electric machine, an input, and an first intermediate shaft and a second gearing arrangement establishing a fixed underdrive relationship between a second rotor of a second electric machine and an output, the method comprising:
    engaging a low mode in which the first intermediate shaft is coupled to the second rotor;
    shifting from the low mode into a high mode in which the first intermediate shaft is operatively coupled to the output; and
    engaging a series mode in which the first rotor is constrained to rotate at a speed proportional to a speed of the input.

22. The method of claim 21 wherein shifting from the low mode into the high mode comprises:
    controlling the second electric machine to propel a vehicle;
    releasing a first shift element;
    after releasing the first shift element, controlling the second electric machine to eliminate relative speed across a second shift element; and after eliminating relative speed across the second shift element, engaging the second shift element.

23. The method of claim 21 wherein shifting from the low mode into the high mode comprises:
   switching a state of a controllable one way clutch; and
   gradually engaging a friction shift element such that the controllable one way clutch overruns.

24. The method of claim 21 wherein engaging the series mode comprises holding the first intermediate shaft against rotation.

25. The method of claim 21 wherein:
   the first gearing arrangement establishes a fixed linear speed relationship among a second intermediate shaft, the first rotor, the input, and the first intermediate shaft; and
   engaging the series mode comprises holding the second intermediate shaft against rotation.

26. The method of claim 25 further comprising engaging a reverse mode in which the second intermediate shaft is coupled to the second rotor.

* * * * *